(12) United States Patent
Berenbaum et al.

(10) Patent No.: US 11,536,701 B2
(45) Date of Patent: Dec. 27, 2022

(54) INTERACTIVE TRANSFORMATIONAL ANALYSIS OF STRUCTURAL HEALTH MONITORING DATA

(71) Applicant: Simmonds Precision Products, Inc., Vergennes, VT (US)

(72) Inventors: Arthur M. Berenbaum, Addison, VT (US); Travis Gang, Hinesburg, VT (US); Katelin J Smith, Williston, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 1525 days.

(21) Appl. No.: 15/686,620

(22) Filed: Aug. 25, 2017

(65) Prior Publication Data

US 2019/0064122 A1 Feb. 28, 2019

(51) Int. Cl.
  *G01N 29/44* (2006.01)
  *G01N 29/04* (2006.01)
  *G06Q 10/00* (2012.01)

(52) U.S. Cl.
  CPC ............ *G01N 29/44* (2013.01); *G01N 29/04* (2013.01); *G06Q 10/20* (2013.01); *G01N 2291/0289* (2013.01); *G01N 2291/042* (2013.01)

(58) Field of Classification Search
  CPC .................. G01N 29/44; G01N 29/04; G01N 2291/0289; G01N 2291/042
  See application file for complete search history.

(56) References Cited

U.S. PATENT DOCUMENTS

| | | | |
|---|---|---|---|
| 7,379,845 B2 | 5/2008 | Gorinevsky et al. | |
| 8,060,319 B2 | 11/2011 | Stothers et al. | |
| 8,355,830 B2 | 1/2013 | Kordonowy | |
| 8,412,470 B2 | 4/2013 | Mathews | |
| 9,701,420 B1 * | 7/2017 | Tucker | G07C 5/0841 |
| 10,394,638 B1 * | 8/2019 | Lay | G06F 11/3409 |
| 2003/0005486 A1 * | 1/2003 | Ridolfo | G05B 23/0272 800/288 |

(Continued)

FOREIGN PATENT DOCUMENTS

WO  WO 2016115075 A1  7/2016

OTHER PUBLICATIONS

V.M. Karbhari et al., "Structural Health Monitoring of Civil Infrastructure Systems," Sep. 23, 2009, CRC Press, XP055510747, ISBN: 978-1-4398-0131-4, pp. 1-52.

(Continued)

*Primary Examiner* — Raymond L Nimox
(74) *Attorney, Agent, or Firm* — Kinney & Lange, P.A.

(57) ABSTRACT

A system and method for analyzing structural heath data includes a structural body, structural health sensors, and first and second computer systems. The structural health sensors are configured to sense data regarding structures of the structural body. The first computer system is configured to collect the sensed data as the structural health data. The second computer system that includes a user interface and display, and is configured to receive the structural health data and provide interactive transformational analysis of the structural health data. The interactive transformational analysis provides, on the display of the second computer system, a visual representation of the structural health data over time.

20 Claims, 9 Drawing Sheets

(56) References Cited

U.S. PATENT DOCUMENTS

| | | | | |
|---|---|---|---|---|
| 2012/0166249 | A1* | 6/2012 | Jackson | G06Q 10/0635 |
| | | | | 705/7.28 |
| 2013/0139598 | A1* | 6/2013 | Sohn | G01N 29/4472 |
| | | | | 73/597 |
| 2015/0035950 | A1 | 2/2015 | Kontsos et al. | |
| 2015/0100917 | A1* | 4/2015 | Palmer | A61M 16/024 |
| | | | | 715/786 |
| 2015/0160169 | A1* | 6/2015 | Hall | G01M 7/02 |
| | | | | 702/39 |
| 2016/0282308 | A1* | 9/2016 | Mofakhami | G01N 29/04 |
| 2016/0340058 | A1* | 11/2016 | Da Silva | B64D 45/00 |
| 2016/0342956 | A1* | 11/2016 | Tucker | G06Q 10/20 |
| 2018/0280803 | A1* | 10/2018 | Projansky | A63F 13/2145 |
| 2019/0061972 | A1* | 2/2019 | Gang | B64D 45/00 |

OTHER PUBLICATIONS

Holger Fluhr, "Avionik und Flugsicherungstechnik: Einführung in Kommunikationstechnik, Navigation, Surveillance," Feb. 6, 2013, Springer, XP055488213, ISBN: 978-3-642-33575-4, pp. 1-146.

Tadeusz Uhl, "Smart Diagnostics V," Jan. 1, 2014, Trans. Tech. Pubn., XP055510771, ISBN:978-3-03785-889-9, pp. 1-36.

Wikipedia, "Structural Health Monitoring," Internet Article, Aug. 1, 2017, XP055510730, Retrieved from the Internet:URL:https://en.wikipedia.org/w/index.php?title=Structural_health_monitoring&oldid=793430365, pp. 1-13.

Wikipedia, "Acars," Internet Article, Aug. 11, 2017, XP055510723, Retrieved from the Internet: URL:https://en.wikipedia.org/w/index.php?title-ACARS&oldid=795081548, pp. 1-6.

\* cited by examiner

INTERACTIVE TRANSFORMATIONAL ANALYSIS OF STRUCTURAL HEALTH MONITORING DATA

BACKGROUND

The present disclosure relates generally to health monitoring, and in particular to the collection, analysis, and interaction with, Structural Health Monitoring data.

Structural Health Monitoring (SHM) systems are sensor-based monitoring systems that enable condition-based monitoring of a structure of a body such as an aircraft floor, wing or fuselage, the hull of a ship, or any other structural body. The goal of such a system is to detect weaknesses in the structure. This way, maintenance personnel, fleet managers, and other interested parties may be notified before any damage becomes catastrophic. Ideally, such notifications would provide sufficient information early enough to allow a maintenance team or other individual to pinpoint the structural problem and pre-order supplies. This way, the problem may be addressed during a regularly scheduled maintenance cycle, thus avoiding unscheduled maintenance while still ensuring safety of the structure being monitored.

SUMMARY

In an embodiment, a system for analyzing structural heath data includes a structural body, structural health sensors, and first and second computer systems. The structural health sensors are configured to sense data regarding a plurality of structures of the structural body. The first computer system is configured to collect the sensed data as the structural health data. The second computer system includes a user interface and display, and is configured to receive the structural health data and provide interactive transformational analysis of the structural health data through the user interface and the display. The interactive transformational analysis provides, on the display of the second computer system, a visual representation of the structural health data over a time period.

In another embodiment, a method for analyzing structural heath data includes obtaining, by a plurality of structural health monitoring (SHM) sensors, structural data for a plurality of structures of a structural body; transmitting the structural data from the structural body to a computer system that includes a display and a user interface; providing, by the computer system through the display and the user interface, interactive transformational analysis of the structural health data; and displaying, by the computer system, a visual representation of the structural health data over a time period.

DETAILED DESCRIPTION

Figure 1:
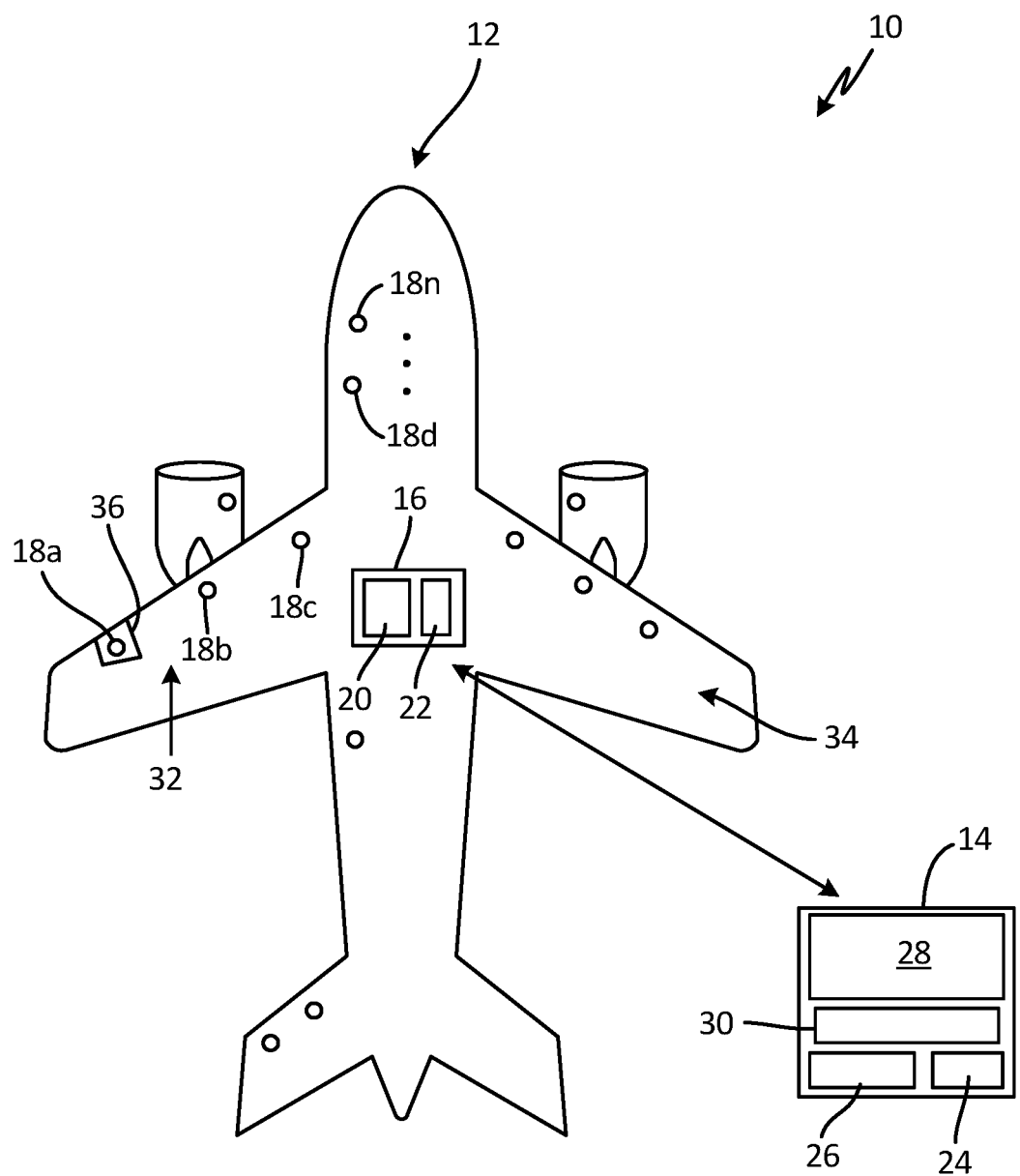
FIG. 1 is a block diagram illustrating a structural health monitoring data collection and processing system.

FIG. 1 is a block diagram illustrating system 10 for structural health monitoring (SHM) data collection, analysis, and interaction. System 10 is implemented for aircraft 12. While illustrated as an aircraft, system 10 may be implemented for any other airborne or ground based vehicle or other structural body for which it is desirable to obtain and analyze structural health data. System 10 further includes ground computer system 14. Aircraft 12 includes onboard computer system 16 connected to receive data from SHM sensors 18a-18n. Onboard computer system 16 includes processor 20 and memory 22. Ground computer system 14 includes processor 24, memory 26, display 28 and user interface 30.

SHM sensors 18a-18n are implemented onboard aircraft 12 to assess the structural integrity of structures of aircraft 12. For example, sensors 18a-18c may be configured to collect structural data regarding left wing 32 of aircraft 12 while other sensors (illustrated but not numbered) may be configured to collect structural data regarding right wing 34. While discussed with regard to wings 32 and 34, SHM sensors 18a-18n may be utilized to collect structural data regarding any structure of aircraft 12 including, but not limited to, the aircraft floor, ceiling, wings, fuselage, and engine casings, among others. The orientation of sensors 18a-18n in FIG. 1 is an illustrative example, and in practice, any number of sensors 18a-18n may be implemented internal or external to any of the structures of aircraft 12.

SHM sensors 18a-18n may utilize, for example, ultrasonic acoustic monitoring to monitor structures of aircraft 12. Guided Wave (GW)/Active Detection is a method of acousto-ultrasonic SHM used to actively interrogate structures of aircraft 12 on demand. It may be initiated by using one of SHM sensors 18a-18n to send a mechanical wave into the structure and measure the resulting vibration signature of the structure. Differences in how the elastic waves travel through the material are detected by system 10 and can be indicative of changes in the structure of aircraft 12 due to damage. In other embodiments, SHM sensors 18a-18n may utilize any other method of structural sensing that results in structural data regarding the structures of aircraft 12.

For GW/Active Detection, changes in the vibration signature may be based on comparison to a scan of the structure at a previous state, typically when the structure is in a known good condition. These scans may be referred to as baseline scans. Typically a number of baseline scans will be performed to capture the response of the structure under various environmental conditions, e.g. under varied temperature or loading conditions. Damage scans may be compared to baseline scans which were taken under environmental conditions closest to the environmental conditions at the time of the damage scan. Thus, using known parameters of the structure in question, the SHM data may be compiled using the difference between a damage scan and a respective baseline scan. SHM data may also be obtained using other methods, such as without comparison to a baseline. For example, comparative vacuum monitoring may be used to detect a crack. In this situation, it may be desirable to perform the interrogation under high stress when the crack is open in order to facilitate detection of the crack.

The SHM data obtained by sensors 18a-18n may be provided to onboard computer system 16 and stored in memory 22, for example, which may be any volatile memory, non-volatile memory, or combination thereof. The data may be stored based upon the zone for which the respective sensor 18a-18n obtained the data. For example, SHM sensor 18a may have obtained data for a zone 36 of left wing 32. When storing the structural health data in memory 22, it may be indicated that the structural data applies to zone 36.

Upon landing of aircraft 12, data may be offloaded from onboard computer system 16 to ground computer system 14 using a wired or wireless connection. In other embodiments, data may be offloaded to ground computer system 14 from onboard computer system 16 at any time using a wireless connection, for example. Upon receipt of data by ground computer system 14, the data may be stored in memory 26, which may be a non-volatile memory, volatile memory, or combination thereof.

Ground computer system 14 may be any computing device such as a laptop, tablet computing device, desktop computer, server, or combination thereof. A database may be implemented within memory 26 of ground computer system 14 and configured to store structural health data for aircraft 12 and/or other structural bodies. Display 28 may be any device capable of providing a visual representation of data and may be a liquid crystal display (LCD), a light emitting diode (LED) display, or any other type of display. User interface 30 is any interface capable of receiving user input such as a keyboard, mouse, microphone, camera, touchscreen, or any other user interface.

Figure 2:
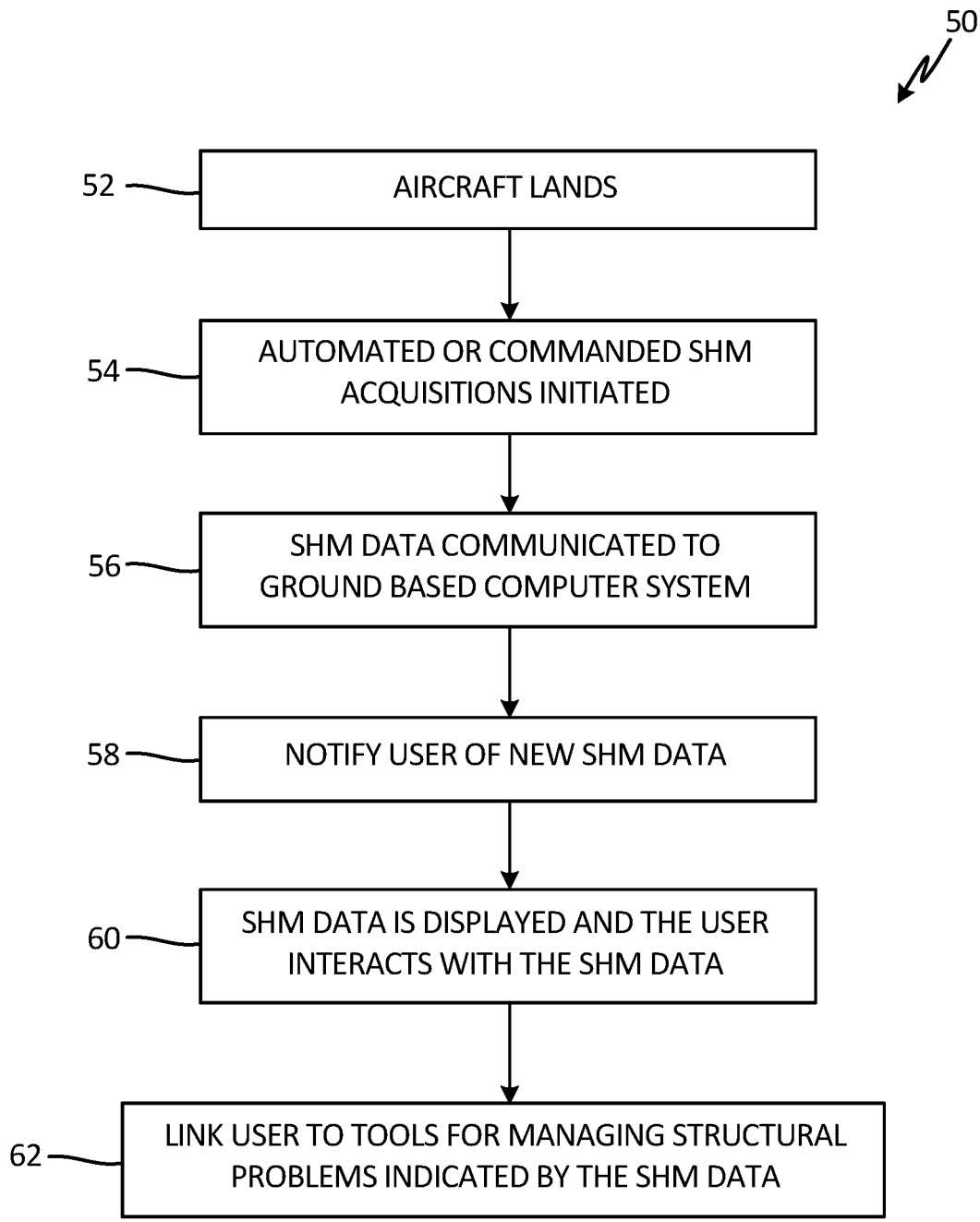
FIG. 2 is a flowchart illustrating a process flow for obtaining, displaying, and interacting with structural health data.

FIG. 2 is a process flow diagram 50 illustrating a process for obtaining and viewing SHM data. At step 52, aircraft 12 lands. At step 54, SHM sensors 18a-18n may be utilized to collect SHM data for aircraft 12. Data collection may be manually commanded or automated. While illustrated as after landing of aircraft 12, manual or automated SHM data acquisition may be performed prior to landing of aircraft 12 as well. At step 56, the collected SHM data is communicated to ground computer system 14. While illustrated in FIG. 1 as a single ground computer system 14, the data may first be provided to a database server, for example, and then accessed by ground computer system 14 through the server.

Ground computer system 14 may be configured to notify a user that new SHM data is available. At step 58, ground computer system 14, or another computer system, notifies an end user that new SHM data is available. This may be accomplished using any method of notification such as a visual indicator on display 28, an e-mail or other electronic message sent to an end user of ground computer system 14, or any other notification methodology.

At step 60, the end user utilizes user interface 30 and display 28 to navigate through the SHM data. As shown in FIGS. 3-7, SHM data may be divided into areas, regions and zones in order to visually aid the end user in understanding the SHM data. For example, a database on ground computer system 14 or other computer system, may include SHM data structures configured to organize the SHM data by zones, regions, areas, and structural body, for example. When SHM data is stored, the data may include entries that define, for example, the zone (e.g., zone 36) that the data belongs to. The data may also include entries that define a region that the data or zone belongs to (e.g., the top of left wing 32), the area that the data belongs to (e.g., wing 32) and/or the structural body that the data or zone belongs to (e.g., aircraft 12). In other embodiments, the organizational structure may be defined in other ways. For example, a lookup table may be defined by ground computer system 14 or other system that defines zones, regions, areas, and or structural body for a given sensor (e.g., sensor 18a) or zone (e.g., zone 36).

The user is then able to interact with the areas, regions and zones using display 28 and user interface 30 to understand and analyze the SHM data. The areas, zones and regions may include rich interactive elements (as seen in FIGS. 3-7) to improve understanding of the SHM data. While reviewing the SHM data, the end user is able to determine, based upon the visualization and organization of the data, whether or not there are any structural problems with aircraft 12 that require attention. At step 62, upon determination of a structural problem with aircraft 12, the end user is linked to tools needed to manage the structural problem. Tools may include, but are not limited to, parts/inventory management systems, collaborative tools, electronic maintenance manuals, and cloud-based tools including research papers, knowledge bases and other cloud-based tools, for example.

Figure 3:
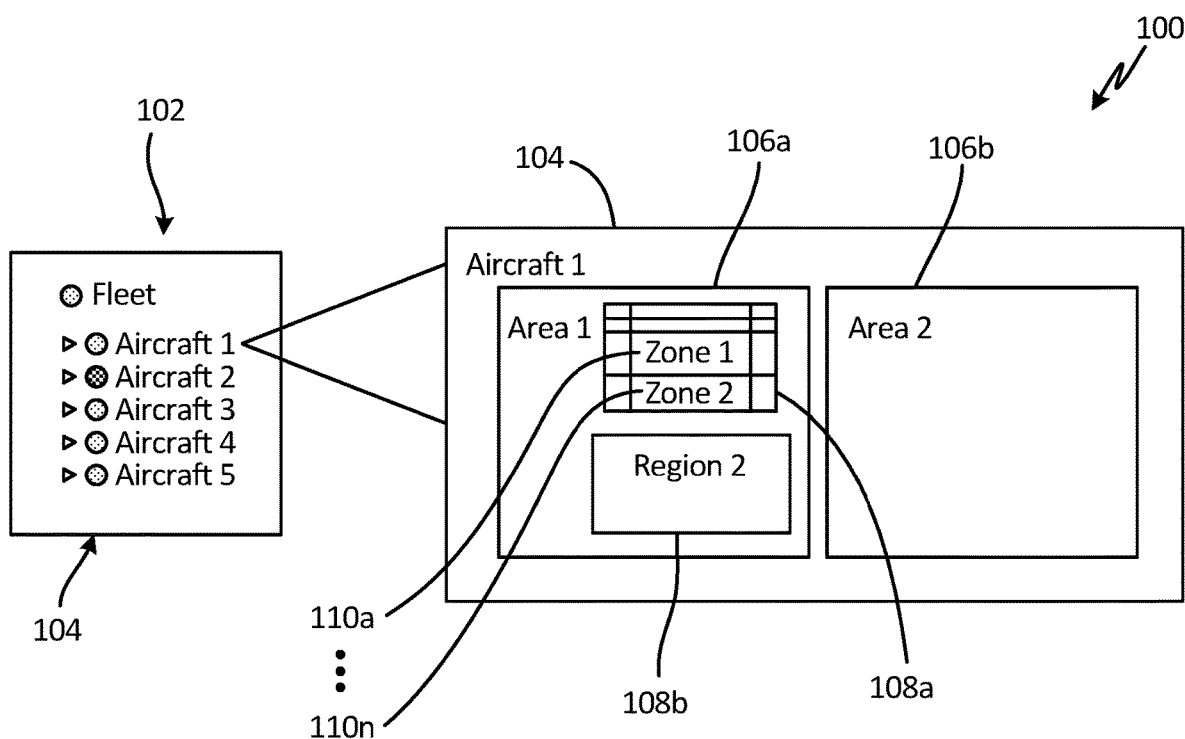
FIG. 3 is a block diagram illustrating logical groupings of structures of a vehicle for which structural health monitoring is performed.

FIG. 3 is a block diagram illustrating a sample organizational structure 100 of SHM data. As discussed above, organizational structure 100 may be implemented as a data structure in a database, using lookup tables, or using any other data storage and organization methods. Organizational structure 100 may include aircraft fleet 102 that includes several aircrafts 104. While illustrated as an aircraft fleet 102, other structural organizations may include other groups of vehicles or structural bodies including ground-based and/or airborne vehicles, wind turbines, or other structures, for example. Aircraft 12 may be one of aircrafts 104 of fleet 102, for example. For each aircraft 104, the aircraft may be divided into structural areas 106a and 106b. While illustrated as two areas 106a and 106b, any number of areas 106 may be included for a vehicle. A structural area may be a logical division of the structural body. For example, wings 32 and 34 of aircraft 12 may each be structural areas. Each area 106a and 106b is divided into regions 108a and 108b. While illustrated as two regions 108a and 108b, any number of regions may be defined for each area 106a and 106b. A region may be a logical subdivision of an area. For example, the top of wing 32 and the bottom of wing 32 may each be a logical region of the area that constitutes wing 32. Each region 108a and 108b may divided into logical structural zones 110a-110n. Each region 108a and 108b may contain any number of zones 110a-110n. A structural zone 110a-110n may be, for example, an area that is sensed by a respective SHM sensor 18a-18n. In other embodiments, zones 110a-110n may be logical subdivisions of a region that include several SHM sensors 18a-18n.

By grouping zones 110a-110n into regions 108a and 108b, and by grouping regions 108a and 108b into areas 106a and 106b, the large amounts of SHM data obtained by sensors 18a-18n may be more logically organized to provide greater ease of access. This way, a health assessment may be made not only for an individual zone 110a-110n of a structural body, but also for a region 108a and 108b, area 106a and 106b, and/or structural body as a whole.

Figure 4:
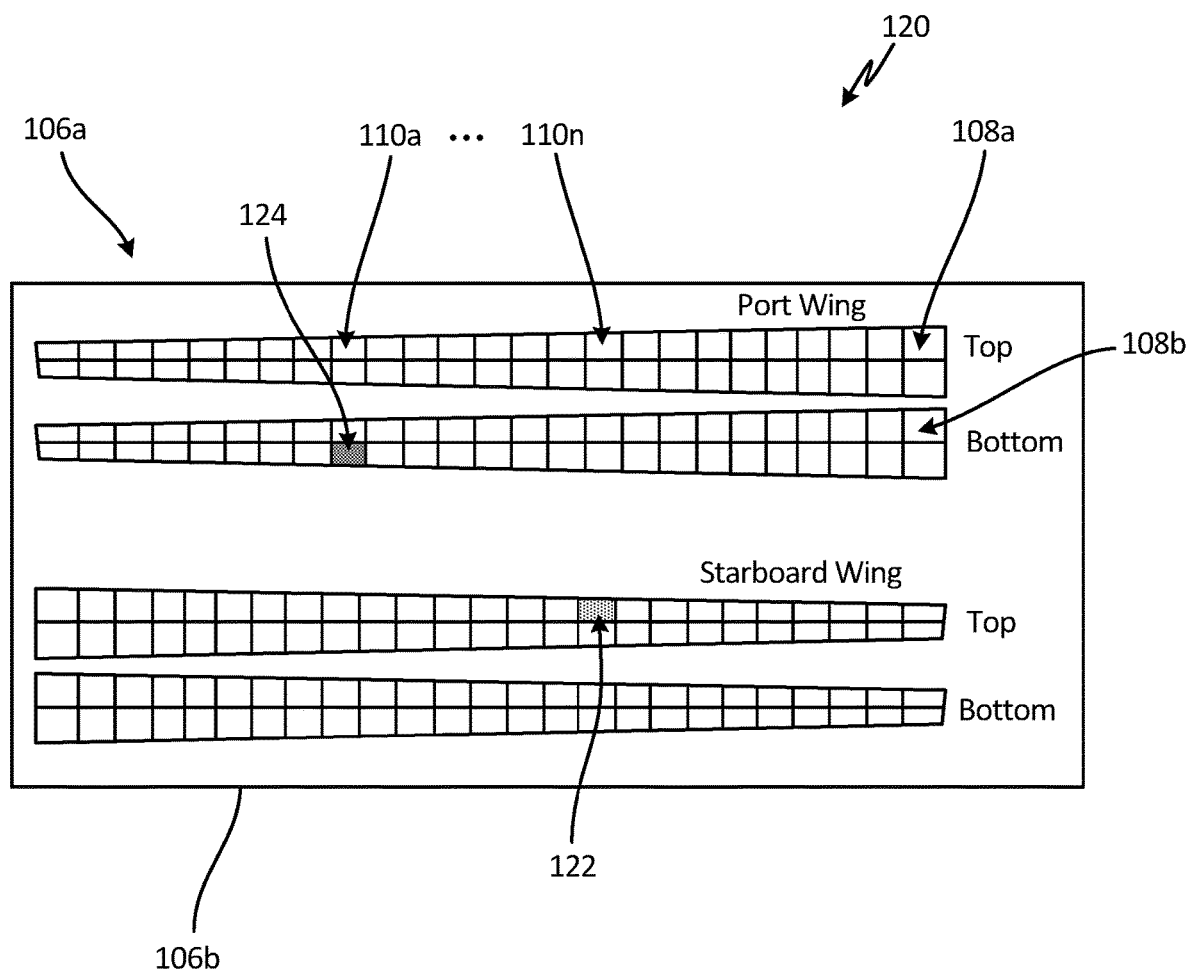
FIG. 4 is a diagram illustrating an embodiment of a display for conveying, and interacting with, structural health monitoring data for structures of a vehicle.

FIG. 4 is a visual display 120 that may be output by display 28, for example, for an end user. Visual display 120 illustrates a visual representation of two areas 106a and 106b of aircraft 12, for example. In the embodiment shown in FIG. 4, area 106a is the port wing 32 and area 106b is the starboard wing 34. Region 108a of area 106a may be the top of port wing 32 and region 108b of area 106a may be the bottom of port wing 32. Region 108a of area 106b may be the top of starboard wing 34 and region 108b of area 106b may be the bottom of starboard wing 34.

Each region 108a and 108b includes zones 110a-110n, for example. As shown in FIG. 4, zones 110a-110n may be colored or shaded to indicate a health level of the respective zone 110a-110n. For example, zone 122 is shaded to indicate that structural damage has reached a threshold value indicative of a first condition. The first condition may be indicative of structural damage forming, but not yet at a level that requires maintenance or other attention. Zone 124 may be shaded to indicate, for example, that structural damage has reached a threshold value indicative of a second condition. The second condition may be indicative of structural damage reaching a level that requires maintenance or other servicing, for example. All other zones 110a-110n may be shaded to indicate that structural damage has not progressed past any threshold. While illustrated as three levels of shading, any number of shades or colors may be utilized to indicate various levels of structural damage to the structures of aircraft 12.

By shading zones in this way, a user is able to easily see at first glance that a particular zone has damage, and where that zone is located. The shading of zone 124 allows a user to immediately see that there is damage to the bottom of port wing 32, and the shading of zone 122 allows a user to immediately see that there is damage forming at the top of starboard wing 34. Without display 120, a user would need to look through all of the SHM data collected to determine if, and where, any structural damage has occurred. Thus, display 120 greatly reduces the amount of time an end user needs to analyze SHM data.

The end user may use also utilize user interface 28 to interact with visual display 120. As seen in FIG. 4, regions 108a and 108b give a visual representation of wings 32 and 34. Thus, the zones 110a-110n are not simple rectangles, but rather are complex shapes representative of the respective zone of the actual structure of aircraft 12. This aids the user in interpreting the SHM data for aircraft 12. A user may utilize a mouse, touchscreen, keyboard, and/or other input device to control a pointer (not shown), for example, displayed on visual display 120. The pointer may be utilized to select a zone by clicking the pointer anywhere within the visual representation of the respective zone. By clicking within the respective zone, the SHM data for that zone may be displayed to the user, allowing easy access to SHM data for any zone of aircraft 12. This same use of complex shapes may also be implemented at the region, area, and/or aircraft level to provide better interaction with the SHM data for the user at all levels of the structural body.

While providing one example embodiment in FIG. 4, display 28 may be configured to provide visual indication of the health of areas 106a and 106b, regions 108a and 108b, and zones 110a-110n in other ways. For example, ground computer system 14 may be configured to illustrate the structural health of aircraft 12 in a "drill-down" manner. For example, a first display may be configured to output a visual representation of the health only for areas 106a and 106b of aircraft 12 (for example, no health representation for regions 108a and 108b, and zones 110a-110n are yet present). A user may then assess the respective health of each of areas 106a and 106b based upon respective visual indicators and, based on the assessment, select one of areas 106a and 106b. Following selection of one of areas 106a and 106b, a new display may be output that shows a visual representation of the health only for the respective regions 108a and 108b of the selected one of the areas 106a and 106b. The user may then assess the respective health of each of regions 108a and 108b and, based on the assessment, select one of regions 108a and 108b. Following selections of one of regions 108a and 108b, a new display may be output that shows a visual representation of the health of respective zones 110a-110n. A respective zone 110a-110n may then be selected and displayed, for example, as shown in FIG. 5.

Figure 5:
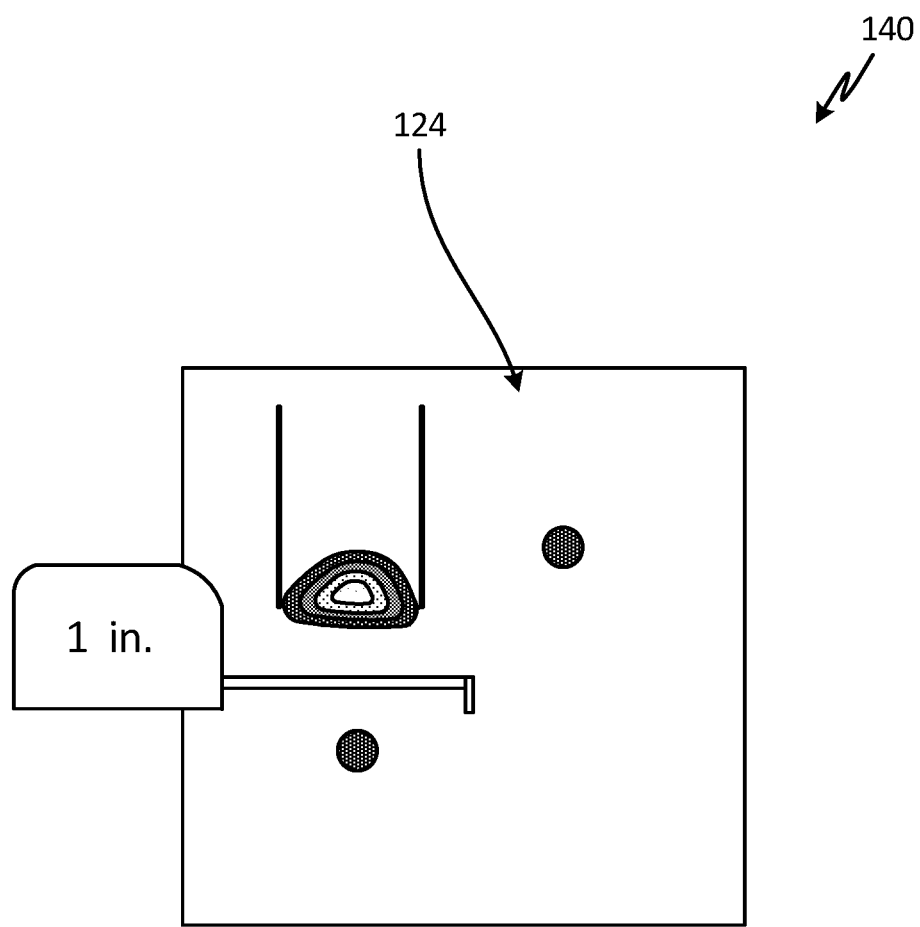
FIG. 5 is a diagram illustrating an embodiment of a display for conveying, and interacting with, structural health data for a zone of a structure of a vehicle.

FIG. 5 is a diagram illustrating a visual display 140 showing an embodiment of a display of zone 124, for example. As discussed above, display 140 may be output to display 28 when a user has selected zone 124 from a visual representation of a region 108a or 108b of zones 110a-110n, for example. Display 140 then allows interactive analysis of SHM data by an end user. As shown in FIG. 5, a user may select a zone (such as zone 124), in order to see a "zoomed in" representation of the SHM data for the respective zone. For example, in zone 124, SHM data indicates some structural damage. The user is able to interact with the SHM data to, for example, take measurements of the damage. In the embodiment shown in FIG. 5, the user is able to measure the data to determine that the SHM data indicates structural damage of one inch in width. While illustrated as a single zone 124, a similar display may include multiple zones 110a-110n, an entire region 108a and 108b, or an entire area 106a and 106b. This way the use is also able to interact with the SHM data in a similar manner, but at a higher level.

Figure 6:
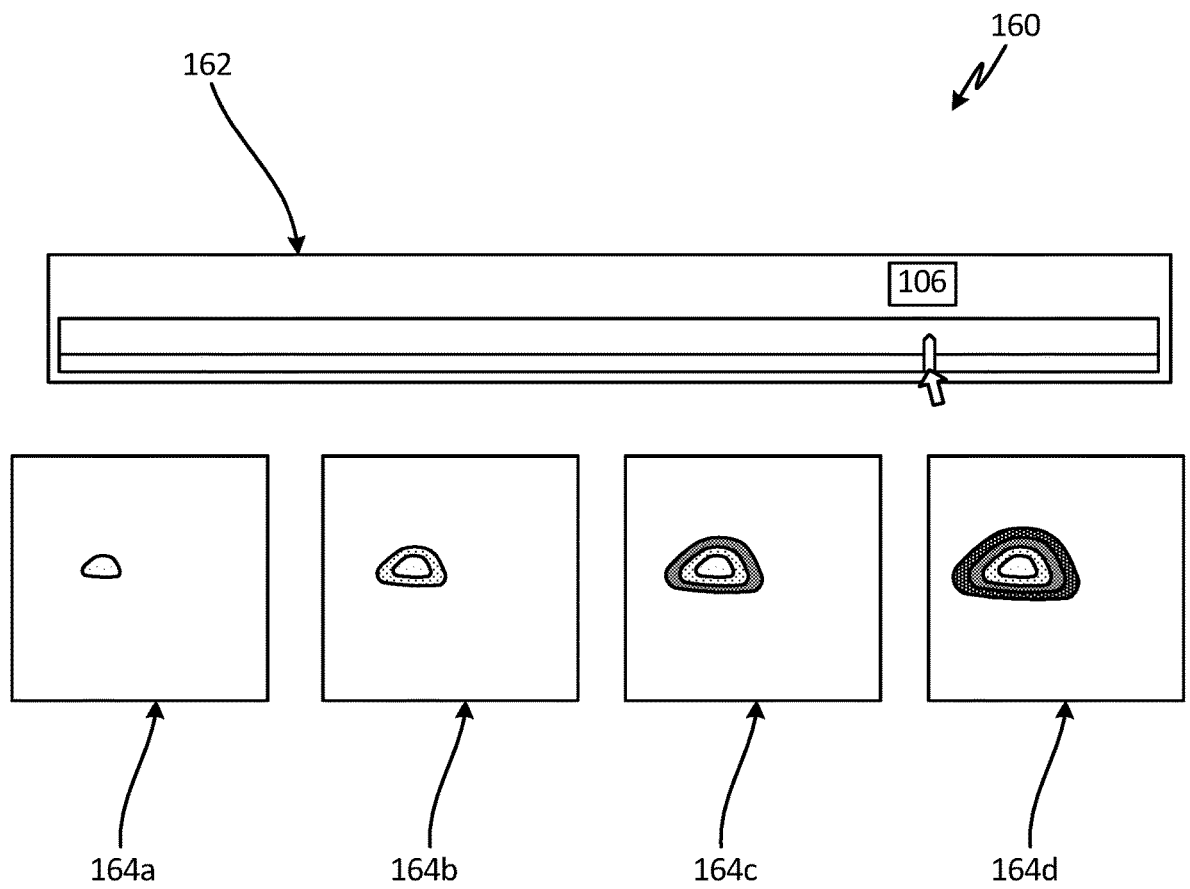
FIG. 6 is a diagram illustrating an embodiment of a display for conveying, and interacting with, structural health data over time.

FIG. 6 is a diagram illustrating display 160 for conveying, and interacting with, structural health data over time. Display 160 includes slider bar 162 and zone images 164a-164b. Utilizing system 10, a user may interact with zones such as zones 110a-110n. While illustrated as a slider bar 162, the user may interact using, for example, swipe motion or other methodology. By controlling slider bar 162, the user is able to interactively move through time and see how the displayed damage for a zone changes throughout a playback period. The playback period may be any amount of time over which data has been collected for the respective zone 110a-110n.

Dynamic playback allows a user to determine trends in a measured zone, for example. In the embodiment illustrated by FIG. 6, slider bar 162 allows a user to select a time during playback to see the SHM data at that point in time. Zone images 164a-164d illustrate four sample visualizations of SHM data for a respective zone during the playback. While shown in a single location along slider bar 162, zone images 164a-164d illustrate SHM data obtained by moving slider bar 162 forward and/or backward in time. For example, image 164a may be from a time at which slider bar 162 is located at the leftmost point of the slider bar, while image 164b may be from a time at which slider bar 162 is at the rightmost point of the slider bar.

Dynamic interaction may also be utilized to help identify zones, areas, and/or regions that may not be covered properly by structural health monitoring system 10. For example, while viewing the SHM data over time, the SHM data may show discontinuities in the displayed damage, allowing a user to determine that the discontinuities are due to the lack of coverage for that zone, region or area by sensors 18a-18n. Additionally, interactions between regions (such as regions 108a and 108b) may be detected that are otherwise not obvious from viewing the SHM data as a single image. For example, if one region is the top of a wing and another region is the bottom of the wing, the interactive transformational analysis of the wing area could show a relationship between how the damage grows on the top and bottom of the wing that is not seen when viewing individual images of SHM data. For example, damage on both the top and bottom of the wing may grow at the same rate, alerting a user to the idea that the damage is related.

While illustrated as discrete zone images 164a-164d, display 160 may also provide fluid control of the playback period. For example, dragging slider bar 162, or hitting a playback button (not shown), may allow the damage for the respective zone(s) to be played back in a continuous fashion such that playback appears like a movie that fluidly displays the damage progression shown by the SHM data. This is advantageous in that it allows a user to see the fluid nature of the damage progression which can trigger visual and cognitive responses that are not possible when simply viewing individual images 164a-164d.

Figure 7:
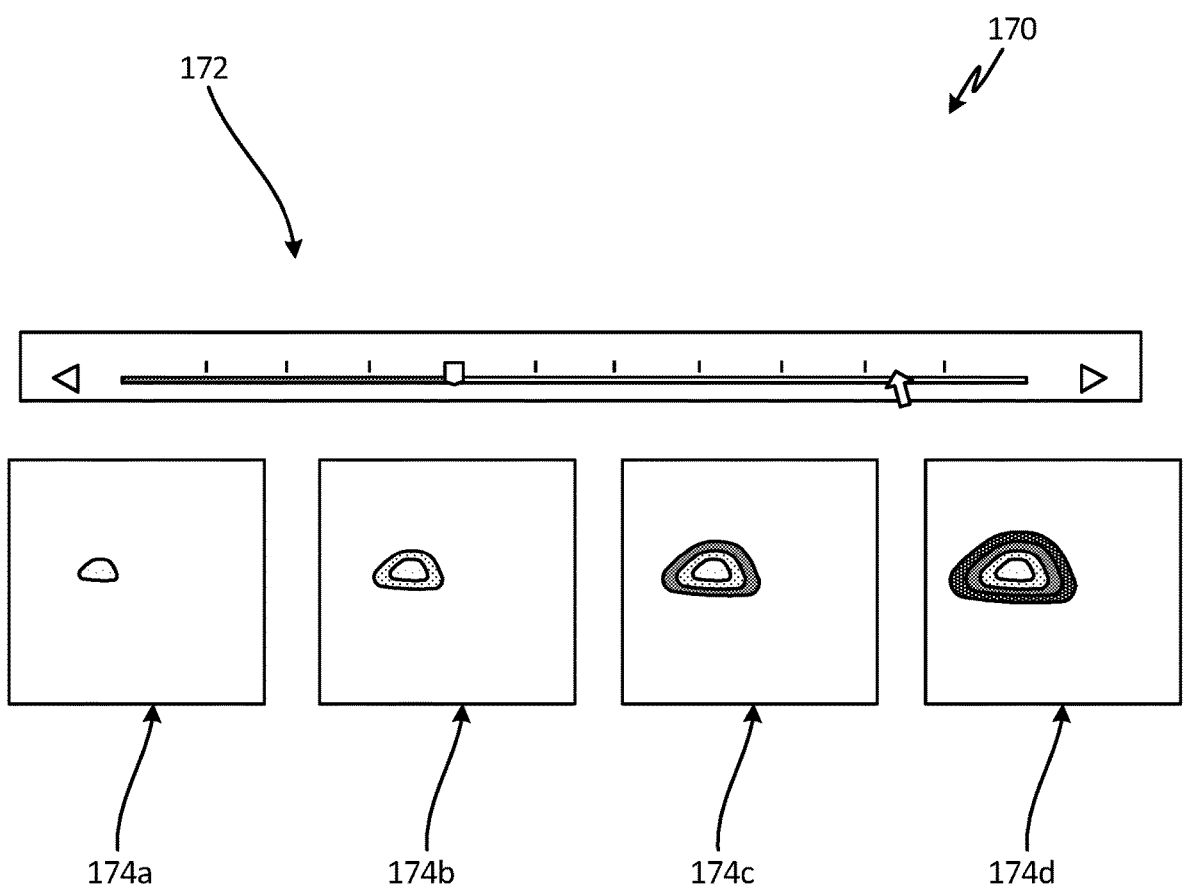
FIG. 7 is a diagram illustrating another embodiment of a display for conveying, and interacting with, structural health data over time.

FIG. 7 is a diagram illustrating display 170 for conveying, and interacting with, structural health data over time. In the embodiment shown in FIG. 7, slider bar 172 acts in an incremental manner, rather than a fluid manner. For example, incremental control can display changing damage in a step-by-step fashion such that playback pauses on each image 174a-174d. This allows the user to closely examine damage changes and easily toggle back and forth between adjacent images 174a-174d. Such toggling can help a user examine how an event that happens at a discrete point in time influences the reported damage.

Figure 8:
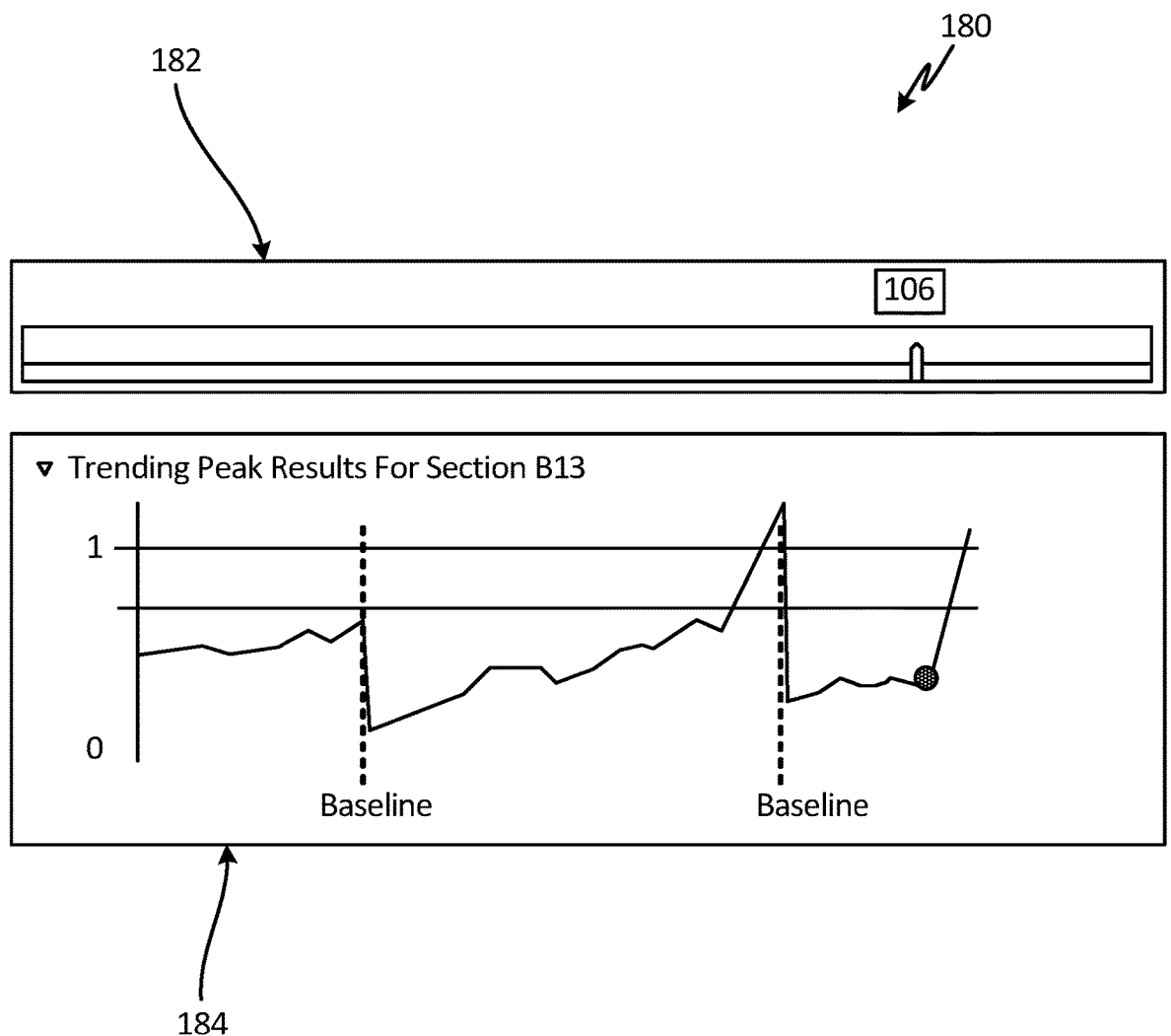
FIG. 8 is a diagram illustrating another embodiment of a display for conveying, and interacting with, structural health data over time.

For the embodiments in FIGS. 6-8, there are many ways in which time may be displayed to the end user. For example, each individual scan may be equally spaced on slider bar 162 or 172, with a timestamp displayed when you select the respective scan using slider bar 162 or 172. Additionally, slider bar 162 or 172 may directly indicate a timestamp of each respective scan. Each available scan may be indicated by a tick (such as the ticks shown in FIG. 7), and the tick may be highlighted when viewing data from that scan. Each tick may be accompanied by the respective timestamp of the scan represented by the tick.

FIG. 8 is a diagram illustrating display 180 for conveying, and interacting with, structural health data over time. FIG. 8 illustrates an embodiment that utilizes highest value trend graphing coupled with fluid slider bar 182 that provides interactive transformational analysis in the form of chart 184, indicating the worst damage in a section (e.g., zone, region or area) over time. While illustrated as a slider bar, any other user control methodology may be implemented.

As illustrated by chart 184, as a user navigates through the past SHM data, the user can see the behavior of a maximum damage point. The maximum damage point may be for a selected zone, region, area, and/or entire structural body, for example. The user may also see how the maximum damage point is increasing over time. For example, visual display 180 may be configured to illustrate a rate-of-change of the maximum damage point over a selected or predefined time interval. Additionally, a new baseline may occur such that the maximum damage point drops to a new baseline state (indicated in FIG. 8 by "baseline"), which may be due to maintenance performed on the structure, for example, significantly reducing or eliminating the maximum damage point in the monitored zone, region, area, and/or structural body. The damage may then begin to rise again due to normal wear and tear, an unexpected weakness in the structure, unexpected impacts on the structure, or other reasons, for example.

Highest value trend graphing, as shown in FIG. 8, may be combined and displayed with damage tracking in order to allow a user to see the damage at a given point in time and the intensity of the worst damage at that point in time. For example, trend analysis 184 may be output along with snapshots 164a-164d (FIG. 6) to show the SHM damage data for a given time along trend analysis 184. This allows the user to see a total picture of the damage at any point along the highest value trend graph.

Additionally, rate of change algorithms may be utilized along with the highest value trend graphing and the damage tracking. As a user navigates through historic data, they can see the damage at a given point in time, the intensity of the worst damage at that point in time and the rate of change of the damage based upon historic data at that point in time. Each of these mechanisms for expressing damage changes as the user navigates through time. This provides the user with a powerful visual and cognitive understanding of the current state of damage at a given point in time along with the speed at which that damage is spreading and intensifying. This can be used for both diagnostic and prognostic analysis of the overall health of the structure being monitored. While illustrated in FIG. 8 as a maximum damage (highest value) trend, in other embodiments, the trend does not need to be a maximum damage trend. For example, the chart may also be implemented using a more complex algorithm that quantifies the overall health of a measured zone, region, area, and/or structural body by combining information about damage intensity, size, shape, or other characteristic of the damage data.

In other embodiments, other tracking methods may be utilized in addition to, or alternative to, highest value trend graphing. For example, multiple trend graphs may be shown on display 180 for respective damage points. The separate damage points may be part of a common zone, region or area, or may be located in separate zones, regions or areas. This way, an end user may visually track multiple damage points over time. The multiple trend graphs may be highest value graphs based upon location, average value graphs based upon location, or any other format that allows an end user to track damage at multiple locations over time.

Figure 9:
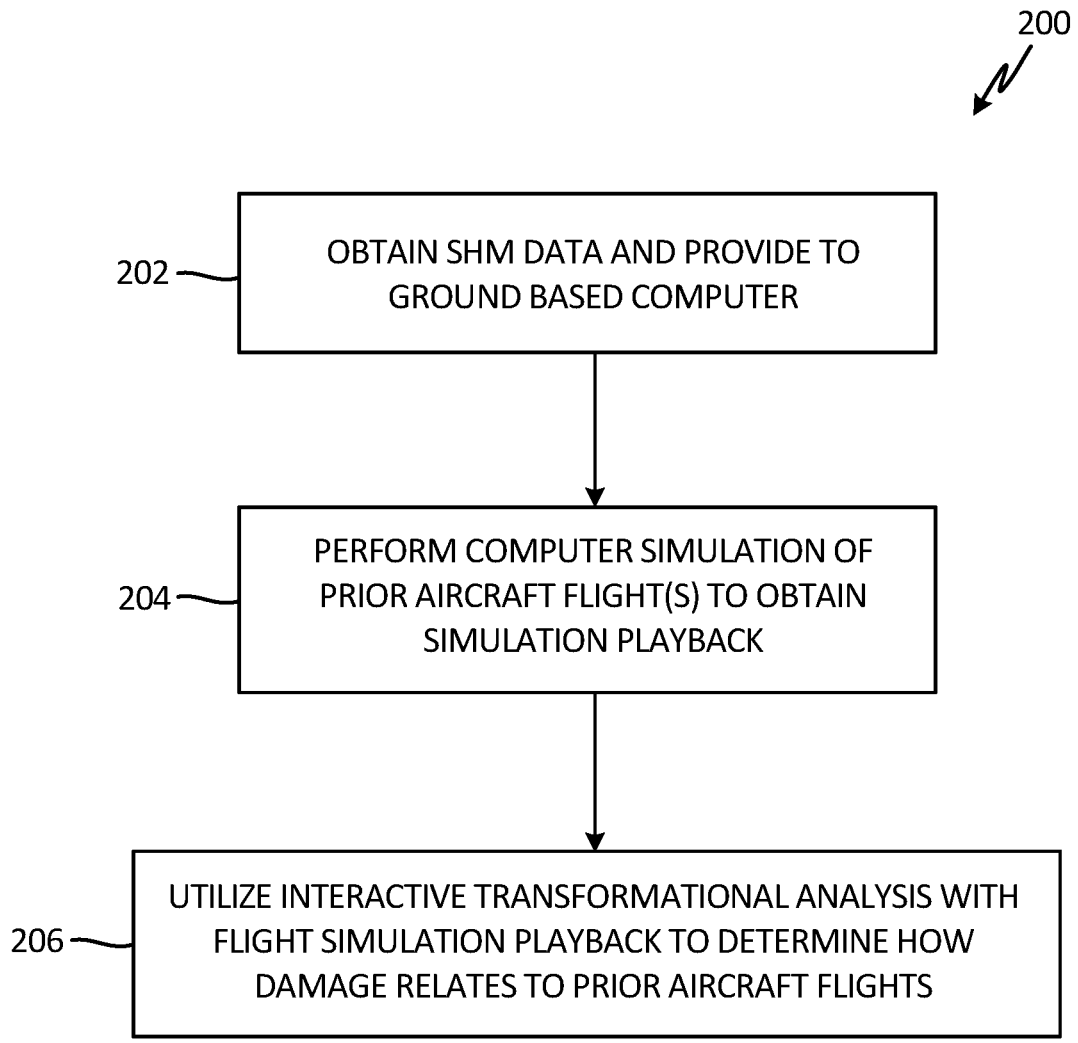
FIG. 9 is a flowchart illustrating a method of interacting with structural health data over time.

FIG. 9 is a flowchart illustrating method 200 of interacting with structural health data over time. At step 202, SHM data is obtained for aircraft 12. At step 204, a flight replay is generated. Flight replay provides a user with the ability to play back a flight in a way that closely resembles a flight simulator but is driven by data collected from an actual flight. The user can see the aircraft in relationship to realistic terrain based upon Global Positioning System (GPS) locations, a known flight path or aircraft heading, ground speed, starting point and other tracked data. The user can also see realistic visualizations of cockpit gauges, controls, and other data. At step 206, utilizing interactive transformational analysis of SHM data, a user can combine interactive structural health transformations that reveal damage changes in the structure with flight playback to gain insights into how the damage relates to the way the aircraft was being flown.

Discussion of Possible Embodiments

The following are non-exclusive descriptions of possible embodiments of the present invention.

A system for analyzing structural heath data includes a structural body, structural health sensors, and first and second computer systems. The structural health sensors are configured to sense data regarding a plurality of structures of the structural body. The first computer system is configured to collect the sensed data as the structural health data. The second computer system includes a user interface and display, and is configured to receive the structural health data and provide interactive transformational analysis of the structural health data through the user interface and the display. The interactive transformational analysis provides, on the display of the second computer system, a visual representation of the structural health data over a time period.

The system of the preceding paragraph can optionally include, additionally and/or alternatively, any one or more of the following features, configurations and/or additional components:

A further embodiment of the foregoing system, wherein the first computer system collects the sensed data as the structural health data by collecting the sensed data for a plurality of zones of the plurality of structures, and wherein the second computer system is configured to output, on the display, visual damage data for a selected one of plurality of zones over the time period.

A further embodiment of any of the foregoing systems, wherein the interactive transformational analysis includes a slider bar output on the display, wherein a user controls the slider bar through the user interface to select a timestamp of the time period for the selected one of the plurality of zones, and wherein, in response to a position of the slider bar, the second computer system outputs, on the display, the visual damage data for the selected one of the plurality of zones for the timestamp.

A further embodiment of any of the foregoing systems, wherein the slider bar acts as a fluid slider bar such that the visual damage data continuously changes on the display as the slider bar is moved by the user.

A further embodiment of any of the foregoing systems, wherein the slider bar is an incremental slider bar such that the visual damage data is updated incrementally on the display for predetermined intervals of the time period.

A further embodiment of any of the foregoing systems, wherein the interactive transformational analysis includes a highest value trend graph output on the display by the second computer system, wherein the highest value trend graph shows a highest damage value for the selected one of the plurality of zones over the time period.

A further embodiment of any of the foregoing systems, wherein the display further outputs at least one rate of change of the highest damage value for the selected one of the plurality of zones over the time period.

A further embodiment of any of the foregoing systems, wherein the display further outputs the visual damage data for a selected time of the time period, wherein the selected time is selected by a user from the highest value trend graph output.

A further embodiment of any of the foregoing systems, wherein the interactive transformational analysis includes a plurality of high value damage trend graphs output on the display by the second computer system, wherein each of the high value damage trend graphs shows a highest damage value over time for respective ones of a plurality of locations within the plurality of structures.

A further embodiment of any of the foregoing systems, wherein the structural body is an aircraft, and wherein the display is configured to output the visual damage data over the time period for the selected one of the plurality of zones in conjunction with a flight replay of the aircraft.

A method for analyzing structural heath data includes obtaining, by a plurality of structural health monitoring (SHM) sensors, structural data for a plurality of structures of a structural body; transmitting the structural data from the structural body to a computer system that includes a display and a user interface; providing, by the computer system through the display and the user interface, interactive transformational analysis of the structural health data; and displaying, by the computer system, a visual representation of the structural health data over a time period.

The method of the preceding paragraph can optionally include, additionally and/or alternatively, any one or more of the following features, configurations and/or additional components:

A further embodiment of the foregoing method, wherein obtaining the structural data comprises collecting the structural data for a plurality of zones of the plurality of structures, the method further includes selecting, by a user, a selected one of the plurality of zones; and outputting, on the display, visual damage data for the selected one of plurality of zones over a time period.

A further embodiment of any of the foregoing methods, wherein providing the interactive transformational analysis of the structural health data includes providing, on the display, a slider bar controllable by a user through the user interface; selecting, by the user, a timestamp of the time period for the selected one of the plurality of zones using the slider bar; and outputting, in response to the selected timestamp, the visual damage data for the selected one of the plurality of zones for the timestamp.

A further embodiment of any of the foregoing methods, wherein providing the interactive transformational analysis of the structural health data includes playing back, by the display, the visual damage data continuously over the time period.

A further embodiment of any of the foregoing methods, wherein providing the interactive transformational analysis of the structural health data includes providing, on the display, an incremental control controllable by the user through the user interface; selecting, by the user, one of plurality of timestamps of the time period set by the incremental control; and outputting, in response to the selected one of the plurality of timestamps, the visual damage data for the selected one of the plurality of zones for the selected one of the plurality of timestamps.

A further embodiment of any of the foregoing methods, wherein providing the interactive transformational analysis of the structural health data includes outputting, by the display, a highest value trend graph, wherein the highest value trend graph shows a highest damage value for the selected one of the plurality of zones over the time period.

A further embodiment of any of the foregoing methods, further including outputting, by the display, at least one rate of change of the highest damage value for the selected one of the plurality of zones over the time period.

A further embodiment of any of the foregoing methods, further including selecting, by a user, a point along the highest value trend graph; and outputting, by the display, the visual damage data for the point along the highest value trend graph.

A further embodiment of any of the foregoing methods, wherein structural body is an aircraft.

A further embodiment of any of the foregoing methods, further including outputting, by the display, a flight replay of the aircraft, wherein the flight replay simulates at least one previous flight condition of the aircraft; and outputting, by the display, the visual damage data over the time period in conjunction with the flight replay of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for analyzing structural heath data, the system comprising:
    a structural body that includes a plurality of structures, wherein the structural body is an aircraft and the plurality of structures are a plurality of aircraft structures;
    a plurality of structural health sensors configured to sense data regarding the plurality of structures;
    a first computer system configured to collect the sensed data as the structural health data for the plurality of structures;
    a second computer system that includes a user interface and display, the second computer system configured to receive the structural health data for the plurality of structures and provide interactive transformational analysis of the structural health data for the plurality of structures through the user interface and the display;
    wherein the interactive transformational analysis provides, on the display of the second computer system, a visual representation of the structural health data for the plurality of structures as visual damage data over a time period and the display is configured to output the visual damage data over the time period for a selected one of the plurality of structures in conjunction with a flight replay of the aircraft, including visualizations of cockpit gauges, controls, and other data.

2. The system of claim 1, wherein the first computer system collects the sensed data as the structural health data by collecting the sensed data for a plurality of zones of the plurality of structures, and wherein the second computer system is configured to output, on the display, visual damage data for a selected one of plurality of zones over the time period.

3. The system of claim 2, wherein the interactive transformational analysis comprises:
    a slider bar output on the display, wherein a user controls the slider bar through the user interface to select a timestamp of the time period for the selected one of the plurality of zones, and wherein, in response to a position of the slider bar, the second computer system outputs, on the display, the visual damage data for the selected one of the plurality of zones for the timestamp.

4. The system of claim 3, wherein the slider bar acts as a fluid slider bar such that the visual damage data continuously changes on the display as the slider bar is moved by the user.

5. The system of claim 3, wherein the slider bar is an incremental slider bar such that the visual damage data is updated incrementally on the display for predetermined intervals of the time period.

6. The system of claim 2, wherein the interactive transformational analysis comprises:
    a highest value trend graph output on the display by the second computer system, wherein the highest value trend graph shows a highest damage value for the selected one of the plurality of zones over the time period.

7. The system of claim 6, wherein the display further outputs at least one rate of change of the highest damage value for the selected one of the plurality of zones over the time period.

8. The system of claim 6, wherein the display further outputs the visual damage data for a selected time of the time period, wherein the selected time is selected by a user from the highest value trend graph output.

9. The system of claim 2, wherein the interactive transformational analysis comprises:
    a plurality of high value damage trend graphs output on the display by the second computer system, wherein each of the high value damage trend graphs shows a highest damage value over time for respective ones of a plurality of locations within the plurality of structures.

10. The system of claim 2, wherein the structural body is an aircraft, and wherein the display is configured to output the visual damage data over the time period for the selected one of the plurality of zones in conjunction with a flight replay of the aircraft.

11. A method for analyzing structural heath data, the method comprising:
    obtaining, by a plurality of structural health monitoring (SHM) sensors, structural data for a plurality of structures of a structural body, wherein the structural body is an aircraft and the plurality of structures are a plurality of aircraft structures;
    transmitting the structural data from the structural body to a computer system that includes a display and a user interface;
    providing, by the computer system through the display and the user interface, interactive transformational analysis of the structural health data for the plurality of structures; and
    displaying, by the computer system, a visual representation of the structural health data for the plurality of structures as visual damage data over a time period, wherein the visual damage data over the time period for a selected one of the plurality of structures is displayed in conjunction with a flight replay of the aircraft, including visualizations of cockpit gauges, controls, and other data.

12. The method of claim 11, wherein obtaining the structural data comprises collecting the structural data for a plurality of zones of the plurality of structures, the method further comprising:
    selecting, by a user, a selected one of the plurality of zones; and
    outputting, on the display, visual damage data for the selected one of plurality of zones over a time period.

13. The method of claim 11, wherein providing the interactive transformational analysis of the structural health data comprises:
    providing, on the display, a slider bar controllable by a user through the user interface;
    selecting, by the user, a timestamp of the time period for the selected one of the plurality of zones using the slider bar; and
    outputting, in response to the selected timestamp, the visual damage data for the selected one of the plurality of zones for the timestamp.

14. The method of claim 12, wherein providing the interactive transformational analysis of the structural health data comprises:
playing back, by the display, the visual damage data continuously over the time period.

15. The method of claim 12, wherein providing the interactive transformational analysis of the structural health data comprises:
providing, on the display, an incremental control controllable by the user through the user interface;
selecting, by the user, one of plurality of timestamps of the time period set by the incremental control; and
outputting, in response to the selected one of the plurality of timestamps, the visual damage data for the selected one of the plurality of zones for the selected one of the plurality of timestamps.

16. The method of claim 12, wherein providing the interactive transformational analysis of the structural health data comprises:
outputting, by the display, a highest value trend graph, wherein the highest value trend graph shows a highest damage value for the selected one of the plurality of zones over the time period.

17. The method of claim 16, further comprising:
outputting, by the display, at least one rate of change of the highest damage value for the selected one of the plurality of zones over the time period.

18. The method of claim 16, further comprising:
selecting, by a user, a point along the highest value trend graph; and
outputting, by the display, the visual damage data for the point along the highest value trend graph.

19. The method of claim 12, wherein structural body is an aircraft.

20. The method of claim 12, further comprising:
outputting, by the display, a flight replay of the aircraft, wherein the flight replay simulates at least one previous flight condition of the aircraft; and
outputting, by the display, the visual damage data over the time period in conjunction with the flight replay of the aircraft.

* * * * *